May 19, 1936. LE ROY S. DUNHAM 2,041,053
CAM LUBRICATING MEANS
Filed March 31, 1934
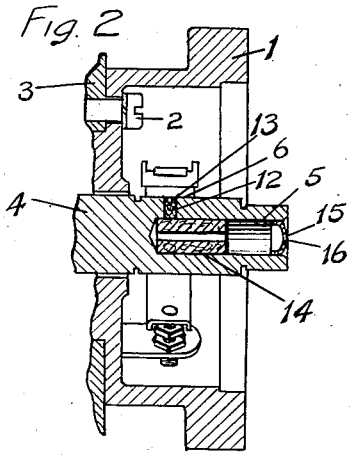
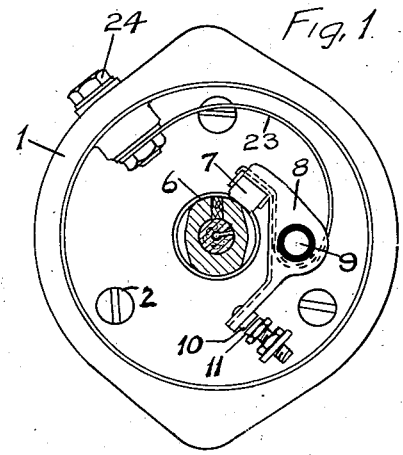
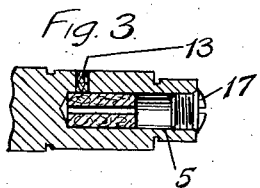
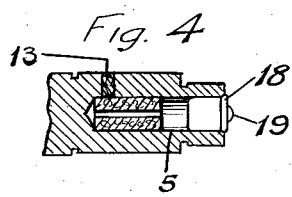
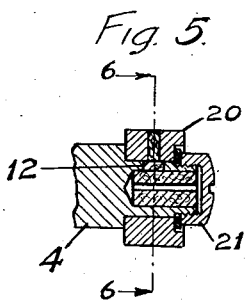
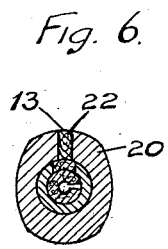
INVENTOR.
LeRoy S. Dunham.
A. D. T. Libby ATTORNEY Patented May 19, 1936

2,041,053

UNITED STATES PATENT OFFICE 2,041,053

CAM LUBRICATING MEANS

Le Roy S. Dunham, East Orange, N. J., assignor to Edison-Splitdorf Corporation, West Orange, N. J., a corporation of New Jersey Application March 31, 1934, Serial No. 718,705

4 Claims. (Cl. 74—567)

This invention relates to ways and means for lubricating a cam or cam surface, particularly such as used in connection with ignition apparatus used on internal combustion engines, wherein the cam or cam surface is rotated at variable speeds reaching relatively high values at frequent intervals of time.

Many suggestions have heretofore been offered for lubricating the cam or cam surface utilized in operating the circuit breaker of such ignition apparatus. The various schemes so far proposed have operated with more or less success and failure due to the fact that the means so far suggested, with which I am familiar, have provided only a small supply of lubricant to be utilized in lubricating the cam surface. For example, it has been proposed to mount on the circuit breaker arm a piece of felt saturated with lubricant so that each time the cam hits the bumper of the circuit breaker, it will touch this felt and pick up a little lubricant therefrom.

An arrangement of this kind is not fully satisfactory because too much oil is taken up in the beginning and is thrown out by the cam surface onto the circuit breaker points with highly detrimental results. As soon as the oil is used or dries up, no more lubrication of the cam takes place and it begins to wear the bumper and finally the circuit breaker action becomes faulty which causes irregular or poor ignition, or none at all. The present-day operator of automotive vehicles pays little attention to such a matter as lubrication of the circuit breaker cam, with the result as above indicated.

It is the object of my invention to provide a reservoir or cavity which will carry a relatively large amount of lubricant and then pass this lubricant from the cavity to the cam surface very slowly, as only a very small and controlled amount need be fed to the surface to keep the cam surface from wearing the bumper or allowing the bumper to damage the cam surface.

Other objects will be obvious to one skilled in this art by a study of the specification taken with the drawing, in which:

Figure 1 is a front view of a circuit breaker housing with the cover removed, showing a cam surface to be lubricated associated with a circuit breaker.

Figure 2 is a vertical, sectional view through Figure 1.

Figure 3 is a sectional view through a shaft having a cam surface similar to that shown in Figure 2, but with a modified form of closing the opening into the end of the shaft.

Figure 4 is a view similar to Figure 3 showing a further modified form of closing the shaft opening.

Figure 5 is a view of a shaft end carrying a cam in place of having a cam surface directly on the shaft as in the previous figures.

Figure 6 is a vertical sectional view on the line 6—6 of Figure 5.

In the various views, 1 is a circuit breaker housing adapted to be fastened in any satisfactory manner as by screws 2 to a support plate 3 of an ignition apparatus. Extending into the housing 1 is a shaft 4 having a cavity or hollow end 5. The shaft end 4 may have a cam surface 6 made integral therewith to engage or function with a bumper 7 carried on a breaker arm 8 pivoted at 9 to the breaker housing 1. As is usual, the breaker arm 8 carries a contact 10 adapted to cooperate with an adjustable contact 11 also carried on the breaker housing. At least one of the contacts 10 or 11 is insulated from the housing, it being understood that the circuit breaker opens and closes the circuit through the primary of the ignition coil. As shown in Figure 1, the breaker arm 8 is the insulated member and is connected by a spring 23 to a terminal post 24 carried on but insulated from the housing 1.

Leading from the cavity 5 is a passageway 12 within which is positioned means for passing the lubricant from the hollow portion 5 very slowly and in controlled amounts to the cam surface 6. The means which I prefer to use is a plug 13 of a suitable grade of wood with the grain running lengthwise of the passageway. In some cases a piece of hard felt may be used. If desired, the cavity 5 may contain a piece of felt 14 of considerable size which will absorb a relatively large quantity of lubricant and feed the same to the passageway 12.

As shown in Figure 2, the cavity 5 extends to the end of the shaft 4 and this end is closed by a spring cap 15 which is forced into the end of the shaft 4. The cap 15 may have a hole 16 to receive the end of an oil can so that the cavity can be filled nearly up to the center line thereof. If desired, the hole 16 may be stopped with a suitable plug. As shown in Figure 3, the cavity end of the shaft is threaded and closed by a screw-plug 17. In Figure 4 the end of the cavity 5 is closed by an oil cap 18 having a ball 19 spring-actuated to hold it in normally closed position so that an oil can may be forced against the ball 19 to direct oil into the cavity 5.

In Figures 5 and 6, I have shown a separate cam member 20 adapted to be fitted on the end of the shaft 4 in the usual manner and held in place thereon by nut 21. The shaft 4 is provided with a passageway 12 as in Figure 1, and the cam 20 provided with a passageway 22 which, when the cam is in position on the shaft, is in alignment with the passageway 12. At least one of these passageways, for example 22, is furnished with the feed-control means 13. By providing the shaft end 4 with a cavity 5 which will hold a relatively large quantity of lubricant, and supplying a means for absolutely regulating the passage of the lubricant from the chamber to the cam surface, I have secured means for lubricating the cam surface which will overcome the objections previously referred to and which will take care of the lack of attention on the part of the operator over prolonged periods of time.

In certain cases, for example in the general application of my invention, the plug in the passageway leading from the shaft cavity to the cam surface may be dispensed with, provided the passageway is small enough and the lubricant heavy or slow-moving enough, so that it cannot be thrown out too fast by the rotation of the shaft. This feeding action may be modified by using a restraining means, such as a piece of felt, within the shaft cavity as indicated in the drawing, it being understood that the size of the passageway and the character of the lubricant are corelated according to the speed of the rotation of the shaft and the amount of lubrication required at the cam surface.

I claim:

1. In an internal combustion ignition apparatus, a shaft carrying a circuit breaker cam surface, means for lubricating said surface comprising a hollow portion in the shaft, said hollow portion carrying lubricant, a passageway leading directly from the hollow portion to said surface, and non-movable capillary acting means in said passageway for controlling the continuous passage of a very small amount of lubricant to said surface.

2. Means for lubricating a cam surface of the kind and as set forth in claim 1, characterized in that said controlling means in said passageway comprises a plug of wood terminating at said surface.

3. Means for lubricating a cam surface of the kind and as set forth in claim 1, characterized in that the hollow portion of the shaft extends to the end thereof for filling purposes, and means positioned within the end of the shaft for closing the shaft end to prevent the lubricant from running out after being inserted within the hollow portion.

4. A cam for an ignition circuit breaker, a support member for the cam, said support member having a cavity for containing a quantity of lubricant, means for passing lubricant to the cavity, said support member and cam having passageways in substantial alignment leading from the cavity to the surface of the cam, and non-movable capillary acting means positioned in at least one of these passageways for slowly and continuously passing a very small amount of lubricant from said cavity to the surface of the cam.

LE ROY S. DUNHAM.